(12) United States Patent
Friedlander et al.

(10) Patent No.: US 8,497,942 B2
(45) Date of Patent: Jul. 30, 2013

(54) USER INTERFACE FOR AUDIO VIDEO DISPLAY DEVICE SUCH AS TV

(75) Inventors: Steven Friedlander, San Diego, CA (US); David Young, San Diego, CA (US); Sabrina Tai-Chen Yeh, Laguna Beach, CA (US)

(73) Assignee: Sony Corporation, Tokyo (JP)

( * ) Notice: Subject to any disclaimer, the term of this patent is extended or adjusted under 35 U.S.C. 154(b) by 140 days.

(21) Appl. No.: 13/155,729

(22) Filed: Jun. 8, 2011

(65) Prior Publication Data

US 2012/0257108 A1 Oct. 11, 2012

Related U.S. Application Data

(60) Provisional application No. 61/473,098, filed on Apr. 7, 2011.

(51) Int. Cl.
H04N 5/445 (2011.01)

(52) U.S. Cl.
USPC .............. 348/563; 348/564; 348/569; 725/40

(58) Field of Classification Search
USPC .... 348/563–565, 569, 734, 725, 731; 725/40, 725/52, 59; 715/784, 786, 763, 835, 853, 715/719, 836, 838, 860, 821, 824; 345/786, 345/854, 720, 968
IPC ...................................................... H04N 5/445
See application file for complete search history.

(56) References Cited

U.S. PATENT DOCUMENTS

| | | | |
|---|---|---|---|
| 6,243,145 B1 * | 6/2001 | Schlarb et al. .................. | 725/39 |
| 7,107,532 B1 * | 9/2006 | Billmaier et al. ............. | 715/720 |
| 8,151,215 B2 * | 4/2012 | Baurmann et al. ............ | 715/835 |
| 2005/0097601 A1 | 5/2005 | Danker et al. | |
| 2005/0257166 A1 | 11/2005 | Tu | |
| 2006/0236362 A1 | 10/2006 | Istvan et al. | |
| 2008/0052742 A1 | 2/2008 | Kopf et al. | |
| 2011/0078738 A1 | 3/2011 | Papaspyropoulos | |
| 2011/0093890 A1 | 4/2011 | Araki et al. | |

FOREIGN PATENT DOCUMENTS

EP 2346242 7/2011

OTHER PUBLICATIONS

Watanabe, J.; Nakajima,I., "Moving-Icon-Based GUI for Accessing Contents at Ease on Mobil Phone", Consumer Electronics, 2005, Issued Jan. 8, 2005.

"Grid Navigation Effects with jQuery" This Information was available on the http://tympanus.net/codrops/2011/06/09/grid-navigation-effects/ website on the search date Aug. 17, 2011.

* cited by examiner

Primary Examiner — Trang U Tran
(74) Attorney, Agent, or Firm — John L. Rogitz

(57) ABSTRACT

In a grid based GUI system that scrolls, a pane in the grid showing a decimated view of a currently selected video does not scroll when the other panels in the grid scroll. In this way the viewer can always see the current video while navigating to other panels in the grid representing respective video content.

20 Claims, 5 Drawing Sheets

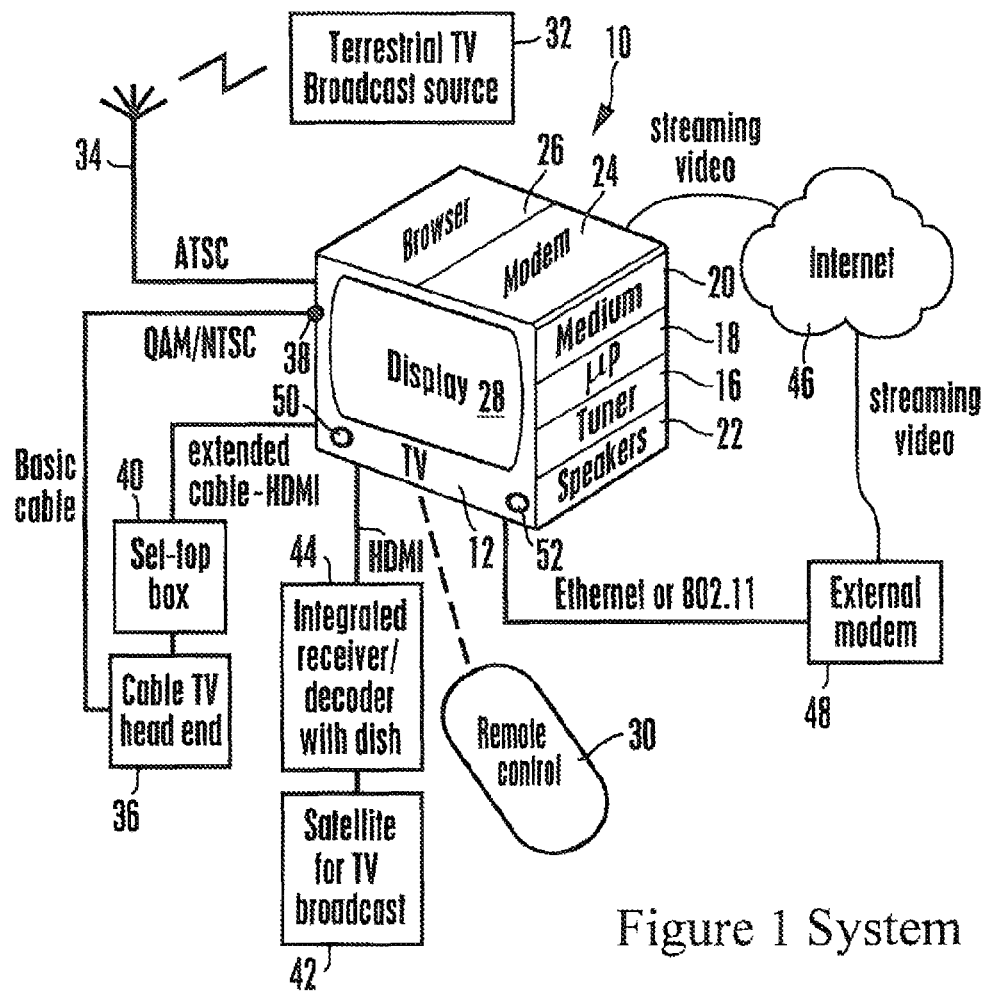
Figure 1 System
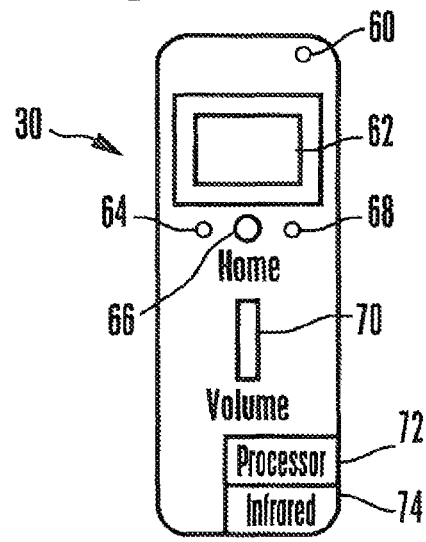
Figure 2 example remote control

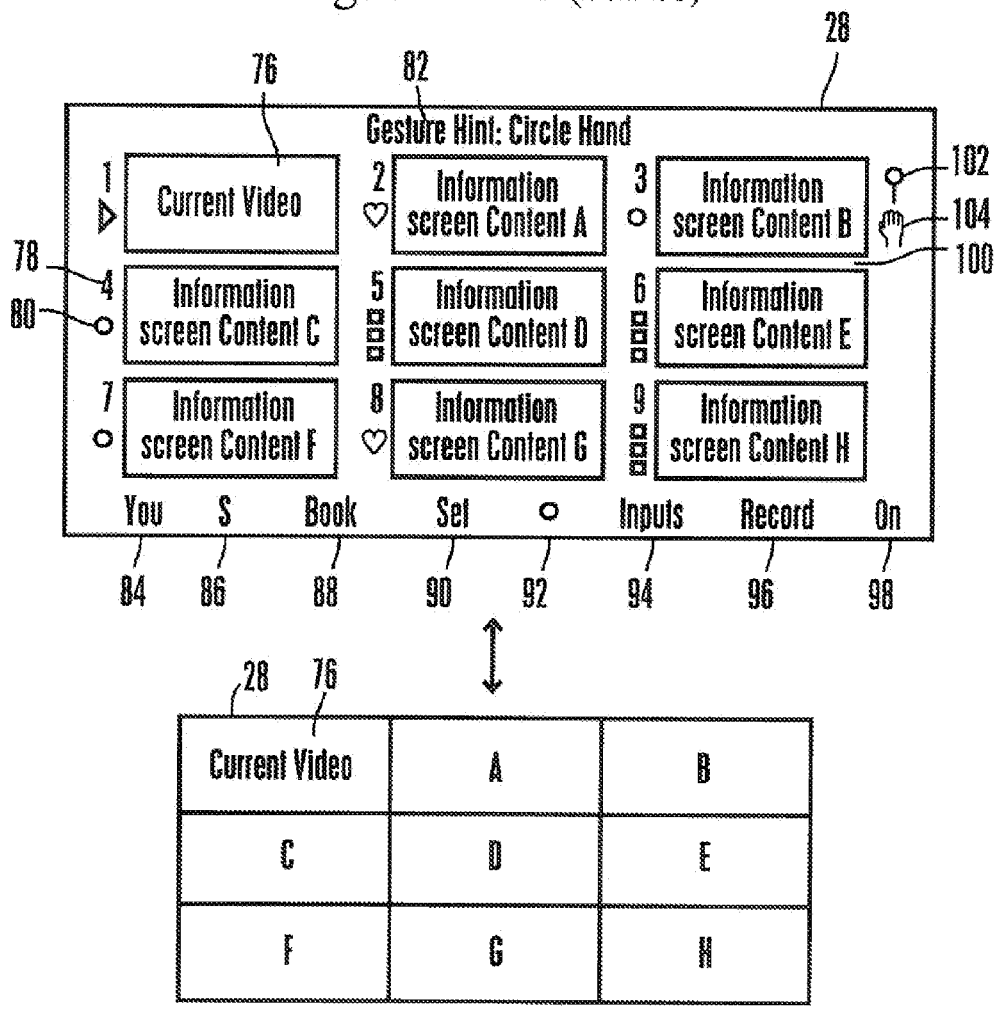

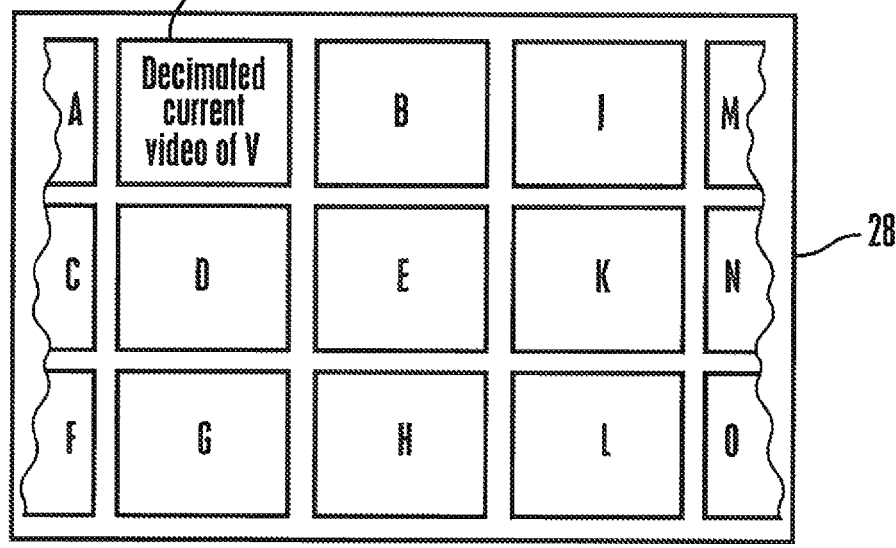
Figure 7 - after left scroll
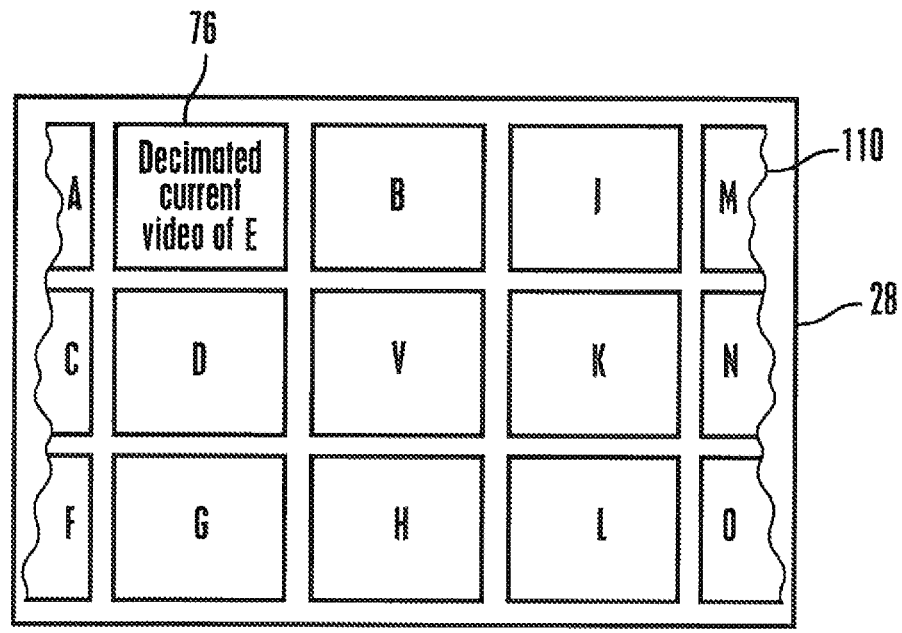
Figure 8  after viewer selects pane E

USER INTERFACE FOR AUDIO VIDEO DISPLAY DEVICE SUCH AS TV

This application claims priority to U.S. provisional patent application Ser. No. 61/473,098, filed Apr. 7, 2011.

I. FIELD OF THE INVENTION

The present application relates generally to user interfaces (UI) for audio video display devices (AVDD) such as televisions (TVs).

II. BACKGROUND OF THE INVENTION

Graphical user interfaces (GUIs) have been provided for audio video display devices (AVDDs) such as TVs in which, for example, an electronic program guide (EPG) is presented next to a small video window in which the current video is presented. As understood herein, navigating to the video window is difficult or non-existent because navigation is centered on the EPG.

SUMMARY OF THE INVENTION

As understood by present principles, it can be advantageous in a GUI for an AVDD to keep one or more items always on the screen while scrolling the rest of the items. Present principles envision such a scrolling system, which may be asymmetrical. In this way a decimated video stream from a TV program can be shown without interruption while navigating an intuitive and interesting menu system while providing for easy item selection and return to a video stream.

According to principles set forth further below, an audio video display device (AVDD) has a processor, a video display presenting demanded images under control of the processor, and a computer readable storage medium bearing instructions executable by the processor to present on the display a graphical user interface (GUI) including plural panels arranged in a grid. A first panel is a current video panel that presents a viewer-selected video. In contrast, panels other than the first panel present respective images and metadata associated with respective video content available for presentation on the display. When the processor receives a viewer scroll command it presents animation on the display showing all panels except the first panel moving translationally away from their respective grid locations at which they were located prior to the scroll command. The first panel, however, is not moved responsive to the scroll command.

In some embodiments the animation shows panels rotating about respective edges. In a specific example nine full panels are presented in the grid arranged in three rows of three panels each, and the first panel remains located in a predetermined onscreen location in the grid as other panels move responsive to the scroll command. The predetermined location can be the upper left corner of the grid, and if desired all nine panels can have the same size as each other.

As explained in greater detail below, to indicate that the panels on the grid are not the only content panels available for selection, faded but still visible left and right panel portions may be presented along left and right edges of the display outside the grid. One faded but still visible panel portion, can be provided on each end of each row of panels. These faded but still visible panel portions can be smaller than the panels.

In an example implementation, responsive to a viewer command to scroll, the processor executes an animation sequence in which all panels other than the first panel rotate simultaneously with each other on the display. The first panel, however, does not rotate. The animation sequence can also include all panels except the first panel simultaneously moving translationally across the display. A second panel other than the first panel is moved an extra column than all other panels other than the first panel responsive to a determination that the second panel would be overlaid on the first panel absent moving an extra column. To achieve this, the processor determines the new positions of the panels independently of other panels. Responsive to a viewer selection of a second panel other than the first panel, video associated with the second panel replaces video in the first panel.

In another aspect, a method includes receiving, at an audio video display device (AVDD), a scroll command to scroll a graphical user interface (GUI) being presented on the AVDD. The GUI includes non-pinned panels representing respective video content and a single pinned panel in which a currently selected live video is presented. Responsive to the scroll command, a new location for each of the non-pinned panels is individually calculated independently of the other non-pinned panels.

In another aspect, an audio video display device (AVDD) has a processor, a video display presenting demanded images under control of the processor, and a computer readable storage medium bearing instructions executable by the processor to present on the display a graphical user interface (GUI) including plural panels arranged in a grid. A first panel is a current video panel while panels other than the first panel represent respective video content. The processor receives a viewer scroll command and responsive to the scroll command moves all panels except the first panel to respective new locations.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a block diagram of a non-limiting example system in accordance with present principles;

FIG. 2 is a plan view of an example remote control (RC) that may be used to control the graphical user interfaces (GUI) described herein, schematically showing the processor and wireless transceiver;

FIG. 3 is a screen shot of a nine panel GUI in a coarse mode suitable for gesture control;

FIG. 4 is a screen shot of a nine panel GUI in a fine mode suitable for RC control;

FIGS. 5-8 are screen shots illustrating features of the nine panel GUI related to pinning the active video pane.

DETAILED DESCRIPTION OF THE PREFERRED EMBODIMENT

Figure 5:
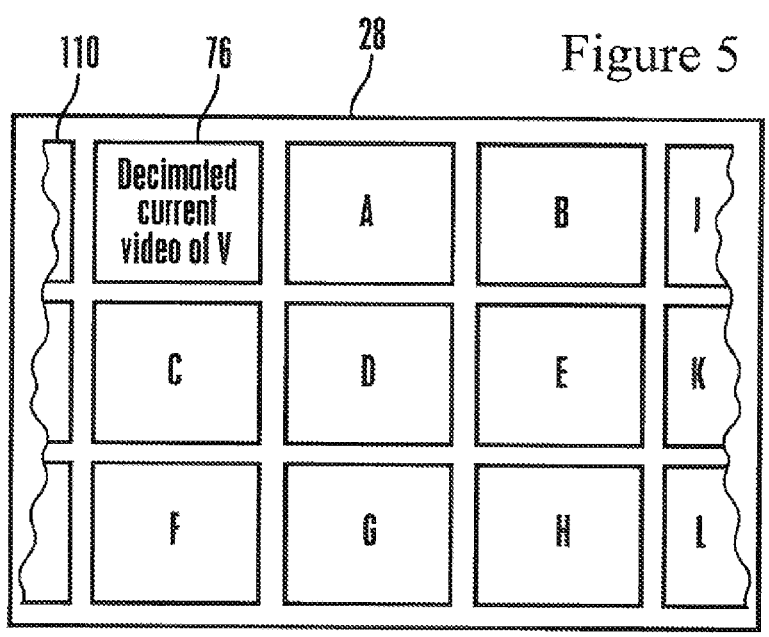

Referring initially to the non-limiting example embodiment shown in FIG. 1, a system 10 includes an audio video display device (AVDD) 12 such as a TV including a TV tuner 16 communicating with a TV processor 18 accessing a tangible computer readable storage medium 20 such as disk-based or solid state storage. The AVDD 12 can output audio on one or more speakers 22. The AVDD 12 can receive streaming video from the Internet using a built-in wired or wireless modem 24 communicating with the processor 18 which may execute a software-implemented browser 26. Video is presented under control of the TV processor 18 on a TV display 28 such as but not limited to a high definition TV (HDTV) flat panel display, and may be a touch screen display. User commands to the processor 18 may be wirelessly received from a remote control (RC) 30 using, e.g., rf or infrared. Audio-video display devices other than a TV may be used, e.g., smart phones, game consoles, personal digital organizers, notebook computers and other types of computers, etc.

TV programming from one or more terrestrial TV broadcast sources 32 as received by a terrestrial broadcast antenna 34 which communicates with the AVDD 12 may be presented on the display 28 and speakers 22. The terrestrial broadcast programming may conform to digital ATSC standards and may carry within it a terrestrial broadcast EPG, although the terrestrial broadcast EPG may be received from alternate sources, e.g., the Internet via Ethernet, or cable communication link, or satellite communication link.

TV programming from a cable TV head end 36 may also be received at the TV for presentation of TV signals on the display 28 and speakers 22. When basic cable only is desired, the cable from the wall typically carries TV signals in QAM or NTSC format and is plugged directly into the "F-type connector" 38 on the TV chassis in the U.S., although the connector used for this purpose in other countries may vary. In contrast, when the user has an extended cable subscription for instance, the signals from the head end 36 are typically sent through a STB 40 which may be separate from or integrated within the TV chassis but in any case which sends HDMI baseband signals to the TV. Other types of connections may be used, e.g., MOCA, USE, 1394 protocols, DLNA.

Similarly, HDMI baseband signals transmitted from a satellite source 42 of TV broadcast signals received by an integrated receiver/decoder (IRD) 44 associated with a home satellite dish may be input to the AVDD 12 for presentation on the display 28 and speakers 22. Also, streaming video may be received from the Internet 46 for presentation on the display 28 and speakers 22. The streaming video may be received at the computer modem 24 or it may be received at an in-home modem 48 that is external to the AVDD 12 and conveyed to the AVDD 12 over a wired or wireless Ethernet link and received at an RJ45 or 802.11x antenna on the TV chassis.

Also, in some embodiments a video camera 50, which may be integrated in the chassis if desired or mounted separately and electrically connected thereto, may be connected to the processor 18 to provide to the processor 18 video images of viewers looking at the display 28. Furthermore, a microphone 52 may be provided on the chassis or separate therefrom and can be electrically connected to the processor 18 to provide viewer-generated voice commands to the processor 18.

FIG. 2 shows that an example RC 30 may include a power on key 60 that can be toggled to energize and deenergize the AVDD 12. A touch-sensitive pad 62 may be provided against which a user can move his finger to correspondingly move a screen cursor on the display 28. Tapping the pad 62 can generate a "select" signal, it being understood that point-and-click devices other than the touch sensitive pad 62 may be used.

Also, a back key 64 may be provided to cause the display 28 to go back a screen shot, i.e., to present the screen shot immediately prior to the one being displayed when the back signal is generated, so as to enable a user to navigate through the various GUIs shown herein. A home key 66 may be provided to cause the below-described "home" GUI to be presented on the display 28, and an options key 68 may be provided to allow a user to cause a list of GUI options to be presented in the display 28. Volume output by the speakers 22 of the AVDD 12 can be controlled using a volume up/down rocker key 70. Manipulation of a key or the pad 62 on the RC 30 causes a respective signal to be sent to an RC processor 72 in the RC 30, which transmits the corresponding command to the AVDD 12 using a wireless transceiver 74 such as but not limited to an infrared transceiver. In addition, if desired four arrow keys may be arranged on the RC 30 to move a cursor up, down, left, and right on the display 28. Also, channel up/down keys may be provided as well as a microphone for voice input. A full QWERTY keyboard or keypad may be provided if desired. The touch pad 62 may be provided with a buzzer or other device to generate tactile feedback to the user.

FIGS. 3 and 4 show an example home GUI that may be presented on the display 28 of the AVDD 12. In the embodiment shown in FIG. 3, nine information panels arranged as shown in three rows of three panels each present visual content. The panels shown in FIG. 3 are of equal size with each other and are rectangular as shown. According to the embodiment shown in FIG. 3, the top left panel 76 of the GUI always shows the currently selected video content, typically either televised content from a selected TV channel or streaming video from a selected website. Information pertaining to available video content is presented in the other eight panels. This information typically includes a non-video photograph or other image, a content source logo indicating the source of the content represented by the panel, and text typically describing the title of the content and other information.

As shown at 78, a numeral may be provided next to each panel, so that the panels may be numbered onscreen from one to nine as shown. This facilitates a user selecting to play video content from a panel by saying the numeral associated with the panel. Also, as shown at 80 a genre indicator may be presented next to each panel. The genre indicator may be an arrow in the case of the first panel 76 indicating that the first panel 76 is presenting the currently selected video. The genre indicator may be a heart (as shown in FIG. 3 for panel 2) indicating the underlying video content has been selected by the user as a "favorite". Other genre indicators may be presented respectively representing "history", meaning that the content associated with the panel had been presented previously, "recommended", meaning that the content associated with the panel is recommended by a recommendation engine executed by the AVDD processor 18, and so on, e.g., "frequently viewed", "promotional content". A user can select to present panels associated with content of only a single genre.

Additionally, if desired the GUI shown in FIG. 3 may present gesture hints 82, describing in text and/or animated hand motion a gesture and its associated command that the user may make, which can be captured by the camera 50 and correlated to the respective command by the processor 18 executing image recognition software. Thus, while viewer input may be afforded by making the display 28 a touch-sensitive display that a viewer can touch and thereby enter commands, present principles envision using viewer gestures in free space, i.e., gestures in which the viewer is distanced from the display 28 as would typically be the case for a TV viewer, with the viewer not touching the display but making gestures that are captured by the camera 50 and correlated to commands by the processor 18 executing image recognition software.

Further, a menu of selections may be presented as shown along the bottom of the GUI, including a "just for you" selector 84 to cause the GUI to contain panels with content personalized to a recognized user. A search selector 86 can be selected to cause a search for a user-input term to be executed. Also, a bookmark selector 88 can be selected to bookmark the currently playing video in panel 76 or to bookmark content in a panel over which the screen cursor is positioned.

Still referring to FIG. 3, a settings selector element 90 if selected causes a setting menus to be presented to control settings of the GUI. A queue selector element 92 may be presented to cause a list of enqueued programs to be presented on the display 2S, and an inputs selector element 94 may be presented, selection of which causes a list of available input sources, e.g., "disk player, cable, satellite" to be presented on the display 28. A recommendations selector element 96 may be presented and if selected causes a list of recommended programming to be presented on the display 28. The list may be generated by a content recommendation engine such as the "Navi" engine made by Sony Corp. A "what's on" selector element 98 may be provided and if selected causes a list of current and future programs such as an electronic program guide (EPG) to be presented on the display 28. Indeed, an EPG may be presented in one of the panels shown in FIG. 3.

In any case, as mentioned above in the example shown the currently selected video content is always presented in the upper left panel 76 of the GUI. Should the user select another panel by using the RC 30 or by speaking the number of the panel or by the appropriate gesture captured by the camera 50, video content from the source associated with the selected panel automatically replaces the video content which was presented in the upper left panel 76 prior to receiving the new select signal. Indeed, should the user scroll the panels left or right to view additional content the upper left panel 76 remains unmoving as the other panels move on and off the display 28 as they are replaced by previously hidden content panels, with the upper left panel 76 always showing the currently selected video program. The upper left current video panel 76 thus is "pinned" in place. Additional details of the above features are explained further below in reference to FIGS. 5-8.

The panel layout shown in FIG. 3 is somewhat coarse in that a visible border space 100 of many pixels width exists between adjacent panels as shown. Such a coarse representation facilitates control using gestures, although navigation by voice and by use of the RC 30 is always preferably enabled regardless of whether the GUI is in the coarse or fine view. FIG. 4 shows that if the user selects the fine view, the border space 100 disappears between adjacent panels, a view more suitable for RC control than gesture control although as stated above all three modes of command input (RC, voice, and gesture) remain enabled simultaneously with each other if desired.

Transition between the two views of FIGS. 3 and 4 may be effected by an appropriate hand gesture (e.g., a vertical motion of the hand) or by an appropriate voice command (e.g., "fine" or "coarse"), or by selecting, using the RC 30, "fine" or "course" from a settings menu accessed by selecting the settings selector element 90 or by pressing a key on the RC 30 or by simply grasping the RC, which is detected by the camera 50 and inferred by the processor 18 to correlate to a command to move to the "fine" screen of FIG. 4. The larger panels in the fine mode of FIG. 4 can be used to present more information than is presented in the panels of FIG. 3.

The GUI shown in FIGS. 3 and 4 may be removed from the screen and the currently playing video presented on the full display 28 by, e.g., toggling the home key on the RC 30. Voice command input may be enabled by voicing a phrase such as "hello TV", which is detected by the microphone 52 and using voice recognition software correlated by the processor 18 to a command to enable voice commands. Voice input may also be enabled using the RC 30 to select the "search" selector element 86. To indicate that voice commands are enabled, an icon such as an image of a microphone 102 can be presented on the display 28. Gesture command input may be enabled by waving the hand, which is detected by the camera 50 and using image recognition software correlated by the processor 18 to a command to enable gesture commands. To indicate that gesture commands are enabled, an icon such as an image of a hand 104 can be presented on the display 28.

Non-limiting examples of corresponding RC, voice, and gesture commands that accomplish the same tasks are:

| RC COMMAND | VOICE COMMAND | GESTURE |
|---|---|---|
| Channel up | "Channel up" | upward motion of hand |
| Channel down | "Channel down" | downward motion of hand |
| Volume decrease | "Quieter" | thumb down |
| Volume increase | "louder" | thumb up |

FIGS. 5-8 show additional features of the nine panel GUI related to scrolling and selecting content. As shown in FIG. 5, which is a simplified version of FIG. 3 except for the side ghost images discussed below, the current video panel 76 that is "pinned" in a predetermined matrix location, e.g., in the upper left position of the nine panel matrix as shown, may be decimated from the received video stream that the viewer has selected for presentation on the AVDD 12. To indicate that the other eight content panels, labeled A-H in FIG. 5, are not the only content panels available for selection, faded but still visible left and right panel portions 110 are presented along the left and right edges of the display 28 outside the nine panel matrix as shown, with one faded but still visible panel portion 110 provided on each end of each row of the matrix as shown except when the left or right column of the matrix represents the last column of content panels. In the embodiment shown in FIG. 5, assume the right faded but still visible panel portions 110 correspond, from top to bottom, to content J, K, and L as indicated in FIG. 5.

Assume the viewer inputs a command to scroll the panels left by entering the appropriate voice command (e.g., "scroll left") or by appropriately manipulating the RC 30 or by making the requisite gesture (e.g., waving a hand horizontally to the left). Assume further for ease of exposition that the viewer wishes to scroll left only a single column, it being understood that the viewer can scroll left through multiple columns in a continuous action in accordance with present principles.

Figure 6:
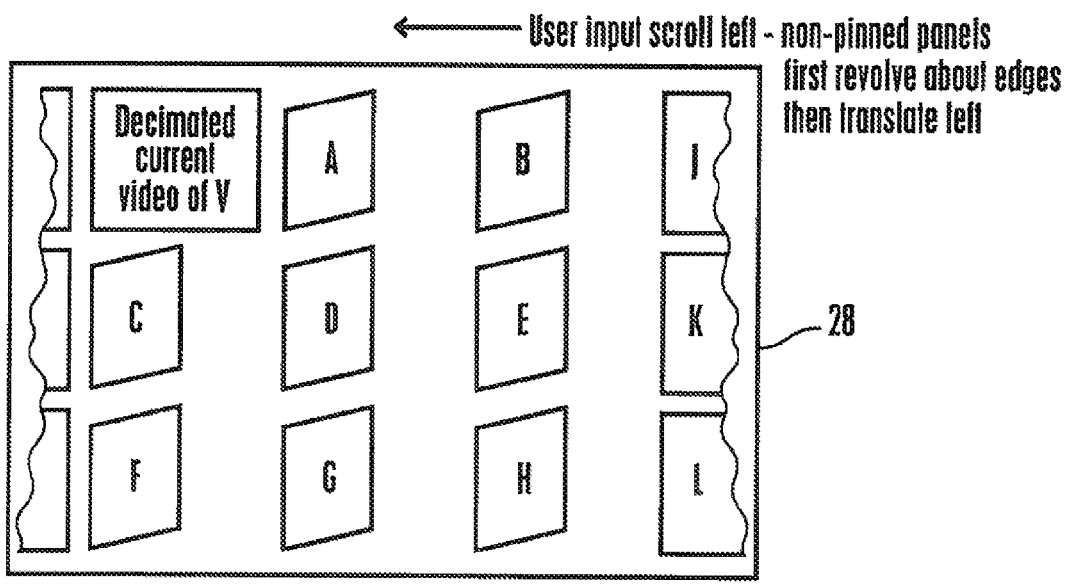

Responsive to the command to scroll left, the processor 18 in the embodiment shown executes an example animation sequence in which all eight non-pinned content panels A-H rotate onscreen about one of their edges in virtual 3D space to the positions shown in FIG. 6. Note that the current video panel 76 does not rotate. Simultaneously or soon after rotation all eight non-pinned content panels A-H move translationally to the left across the display 28 to the new matrix locations shown in FIG. 7, in which they have also rotated back to a 2D rectangular aspect. The current video panel 76 remains in its pinned location, continuously showing the selected video stream during the course of the scrolling process.

The animation may be staggered or asymmetrical. As an example, each panel that moves might rotate in a random sequence before or after the other panels so that each panel rotates at a time unique to that panel, so that all eight moving panels rotate in temporal sequence, not simultaneously with other, perhaps spaced apart from each other by a few tends of milliseconds. Thus, the first of the eight panels may begin rotation at time t, the second at time t+1, the third at time t+2, and so on. Or, each panel in a group of two or more panels may begin rotating simultaneously with other panels in that group, while each panel in a different group of panels might begin rotating a few milliseconds after the panels in the first group. Translation may begin contemporaneously with rotation, or in the middle of rotation in one direction, or after rotation has been completed, with the panel then rotating back in the second direction after translation.

It should be noted comparing FIG. 7 to FIG. 5 that after the above scroll (for simplicity, of a single column), the content panels of the right-most column before the scroll (B, E, and H) occupy the middle column after the scroll, and new content panels J, K, and L which had been represented by the faded but still visible right panel portions 110 in FIG. 5, are shown as full matrix rectangles in FIG. 7 in the right most column, with new faded but still visible right panel portions 110 (corresponding to content M, N, and O) appearing along the right hand border of the display 28 as shown.

It should be further noted that the middle and bottom leftmost non-pinned panels C and F in FIG. 5 have moved, owing to the scrolling action, off screen and are represented by respective faded but still visible left panel portions 110 as shown. However, unlike the other non-pinned panels of FIG. 5, the non-pinned panel corresponding to content A has moved not one but two matrix columns, passing under the pinned current video panel 76 and being represented in FIG. 7 by a respective faded but still visible left panel portion 110 as shown.

Figure 9:
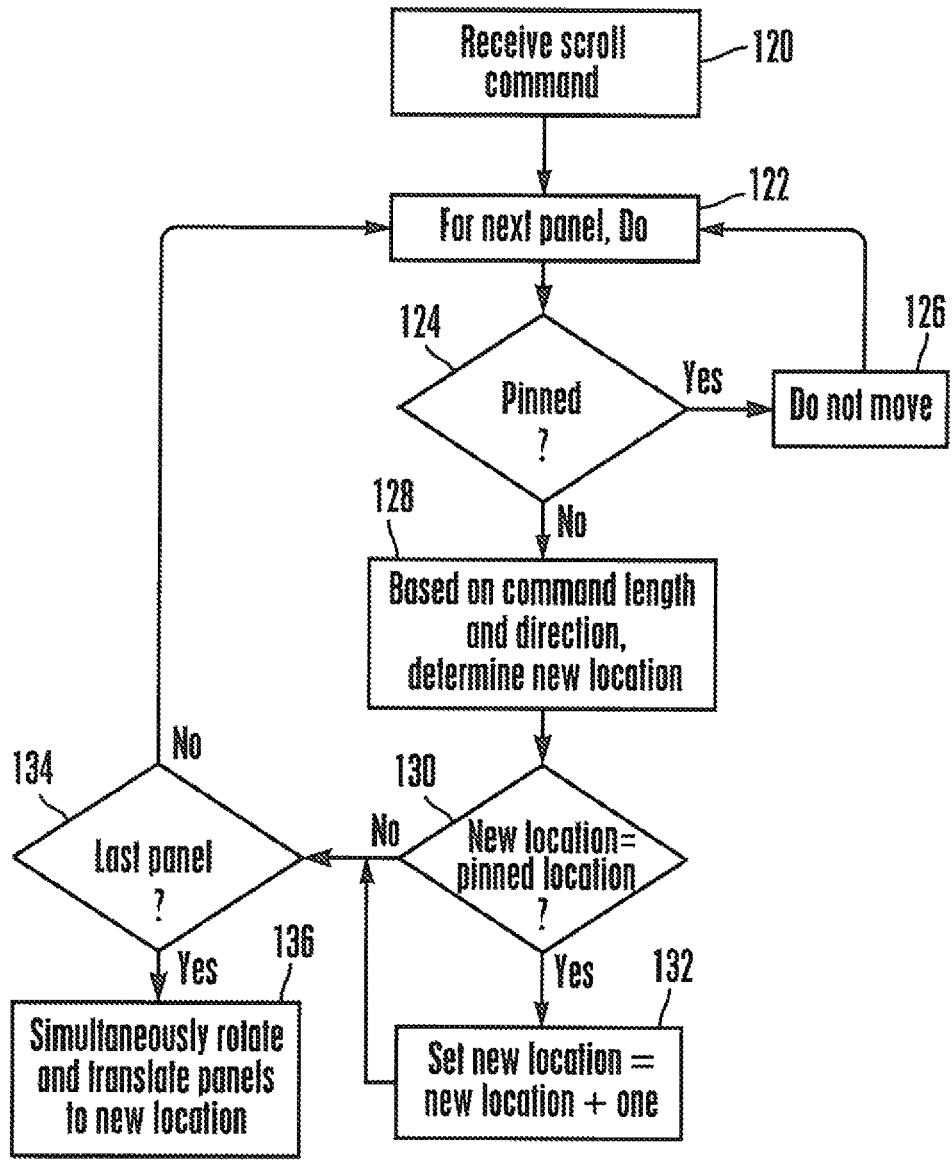
FIG. 9 is a flow chart of example logic for scrolling in the nine panel GUI.

To facilitate the above operation, the processor 18 may move each panel in the matrix or grid independently of other panels. As description of non-limiting example logic for doing so is shown in FIG. 9. It may now be appreciated that by pinning the current video panel 76 in place as described while the other panels move, navigation of the panel grid system is made easy while providing the ability to keep the decimated video continuously playing and visible at all times. It may be further appreciated that the partial panel portions 110 provide a visual hint that additional content apart from that represented by the nine grid panels is available for view.

Now assume that from FIG. 7 a viewer selects the non-pinned content panel E by voicing its panel number, or by making an appropriate gesture (e.g., clenched fist when the screen cursor is positioned over the panel E), or by appropriately manipulating the RC 30. Recall that the content panel E, while presenting a still image and metadata, is associated with a video the source of which can be from a TV channel or an input source such as a disk player or a website. Selection of the content panel E causes the video represented by the content panel to be presented in the current video panel 76 as shown, replacing the video V that had been shown there. In contrast, a new content panel V representing the former video that has been replaced by video E in the panel 76 occupies the former location of the matrix of the selected panel, in this case, the middle location.

Turning to FIG. 9, commencing at block 120 a scroll command is received by the processor 18 from a viewer in accordance with the command input modes described above. For the next panel implicated by the scroll command, a process is entered at block 122. Initially, the next panel will be the first panel implicated by the scroll command. All initially visible panels in the nine panel matrix or grid are implicated by a scroll command as are the panel portions 110 and, depending on the length of the scroll command, additional, initially unseen panels corresponding to additional content. The order in which panels are selected may be based on the scroll direction, so that a right scroll will cause the right-most column of panels implicated by the command to be processed first and a left scroll vice-versa.

Proceeding to decision diamond 124 it is determined whether the panel under test is the pinned panel 76 and if so the logic proceeds to block 126 to not move the panel, returning to block 122 to retrieve the next panel. Otherwise, the logic moves to block 128 to compute the new position of the panel under test based on the command length (i.e., how long the scrolling motion is, indicating how many columns of panels to scroll through) and command direction (indicating the direction of the scroll). Thus, if the viewer inputs a command to scroll two columns to the left, the new position of the panel under test will be two columns to the left of its initial position.

After determining the new position the processor determines at decision diamond 130 whether the new position is the location of the pinned current video panel. If it is, the logic moves to block 132 to refine the new location to be one additional column in the direction of the scroll. It will be appreciated that in the case of the panel A in FIG. 5, its new position responsive to the example "scroll one column left" command would be calculated at block 128 to be at the location of the pinned panel 76 and so at block 132 its new location would be refined to be one additional panel to the left to the partial panel 110 position shown in FIG. 7.

From block 132 or from decision diamond 130 if the test there is negative the logic flows to decision diamond 134 to determine if the last implicated panel has been tested, and if not the logic loops back to block 122 to test the next panel. When all implicated panels have been tested the processor 18 proceeds to block 136 to simultaneously rotate and translate all panels implicated by the command to their new locations as described above in reference to FIGS. 5-7.

While the particular USER INTERFACE FOR AUDIO VIDEO DISPLAY DEVICE SUCH AS TV is herein shown and described in detail, it is to be understood that the subject matter which is encompassed by the present invention is limited only by the claims.

What is claimed is:

1. Audio video display device (AVDD) comprising:
   processor;
   video display presenting demanded images under control of the processor;
   computer readable storage medium bearing instructions executable by the processor to:
   present on the display a graphical user interface (GUI) including plural panels arranged in a grid, a first panel being a current video panel presenting a viewer-selected video, panels other than the first panel presenting respective images and metadata associated with respective video content available for presentation on the display;
   receive a viewer scroll command; and
   responsive to the scroll command, presenting animation on the display showing all panels except the first panel moving translationally away from their respective grid locations at which they were located prior to the scroll command, the first panel not being moved responsive to the scroll command.

2. The AVDD of claim 1, wherein the animation shows at least some panels rotating about respective edges.

3. The AVDD of claim 1, wherein nine full panels are presented in the grid arranged in three rows of three panels each and the first panel remains located in a predetermined onscreen location in the grid as other panels move responsive to the scroll command.

4. The AVDD of claim 3, wherein the predetermined location is the upper left corner of the grid and all nine panels have the same size as each other.

5. The AVD of claim 1, wherein to indicate that the panels on the grid are not the only content panels available for selection, faded but still visible left and right panel portions are presented along left and right edges of the display outside the grid, with one faded but still visible panel portion provided on each end of each row of panels, the faded but still visible panel portions being smaller than the panels.

6. The AVDD of claim 1, wherein responsive to a viewer command to scroll, the processor executes an animation sequence in which all panels other than the first panel rotate simultaneously with each other on the display, the first panel not rotating, the animation sequence also including all panels except the first panel simultaneously moving translationally across the display, a second panel other than the first panel being moved an extra column than all other panels other than the first panel responsive to a determination that the second panel would be overlaid on the first panel absent moving an extra column.

7. The AVDD of claim 1, wherein responsive to the scroll command, the processor calculates a new position for each panel other than the first panel independently of calculating the positions of other panels.

8. The AVDD of claim 1, wherein responsive to a viewer selection of a second panel other than the first panel, video associated with the second panel replaces video in the first panel.

9. Method comprising:
   receiving, at an audio video display device (AVDD), a scroll command to scroll a graphical user interface (GUI) being presented on the AVDD, the GUI including non-pinned panels representing respective video content and a single pinned panel in which a currently selected live video is presented; and
   responsive to the scroll command, individually calculating a new location for each of the non-pinned panels independently of the other non-pinned panels.

10. The method of claim 9, comprising, for each non-pinned panel, computing a new position of the non-pinned panel based on the command.

11. The method of claim 10, comprising determining whether the new position is a location of the pinned panel, and responsive to a determination that the new position is a location of the pinned panel, refining the new location to be one additional column of the GUI in a direction of the scroll.

12. The method of claim 9, comprising simultaneously rotating and translating all non-pinned panels responsive to the scroll command.

13. Audio video display device (AVDD) comprising:
   processor;
   video display presenting demanded images under control of the processor;
   computer readable storage medium bearing instructions executable by the processor to:
   present on the display a graphical user interface (GUI) including plural panels arranged in a grid, a first panel being a current video panel, panels other than the first panel representing respective video content;
   receive a viewer scroll command; and
   responsive to the scroll command, moving all panels except the first panel to respective new locations and not moving the first panel.

14. The AVDD of claim 13, wherein the processor presents animation on the display showing all panels except the first panel moving translationally away from their respective grid locations at which they were located prior to the scroll command, the first panel not being moved responsive to the scroll command.

15. The AVDD of claim 14, wherein the animation shows at least some panels rotating about respective edges.

16. The AVDD of claim 13, wherein nine full panels are presented in the grid arranged in three rows of three panels each and the first panel remains located in a predetermined onscreen location in the grid as other panels move responsive to the scroll command.

17. The AVDD of claim 16, wherein the predetermined location is the upper left corner of the grid and all nine panels have the same size as each other.

18. The AVD of claim 13, wherein to indicate that the panels on the grid are not the only content panels available for selection, faded but still visible left and right panel portions are presented along left and right edges of the display outside the grid, with one faded but still visible panel portion provided on each end of each row of panels, the faded but still visible panel portions being smaller than the panels.

19. The AVDD of claim 13, wherein responsive to a viewer command to scroll, the processor executes an animation sequence in which all panels other than the first panel rotate simultaneously with each other on the display, the first panel not rotating, the animation sequence also including all panels except the first panel simultaneously moving translationally across the display, a second panel other than the first panel being moved an extra column than all other panels other than the first panel responsive to a determination that the second panel would be overlaid on the first panel absent moving an extra column.

20. The AVDD of claim 13, wherein responsive to the scroll command, the processor calculates a new position for each panel other than the first panel independently of calculating the positions of other panels.

* * * * *